United States Patent [19]

Mathur et al.

[11] 4,257,817

[45] Mar. 24, 1981

[54] METHOD OF REDUCING BINDER DEMAND OF INORGANIC FILLER

[75] Inventors: Krishna K. Mathur; Olinda W. Rush, both of Easton, Pa.

[73] Assignee: Pfizer Inc., New York, N.Y.

[21] Appl. No.: 83,824

[22] Filed: Oct. 11, 1979

Related U.S. Application Data

[63] Continuation of Ser. No. 873,975, Jan. 31, 1978, abandoned.

[51] Int. Cl.$^3$ .................. C08L 91/00; C09C 3/04
[52] U.S. Cl. .................. 106/266; 260/37 EP; 260/40 R; 106/288 R; 106/309; 423/326; 423/430; 423/625
[58] Field of Search .............. 106/266, 309; 423/326, 423/430, 625; 260/40, 37 EP

[56] References Cited

U.S. PATENT DOCUMENTS

| | | | |
|---|---|---|---|
| 3,034,859 | 5/1962 | Gunn et al. | 106/291 |
| 3,343,973 | 9/1967 | Billue | 106/309 |
| 4,205,964 | 6/1980 | Hill | 106/73.4 |

*Primary Examiner*—Theodore Morris
*Attorney, Agent, or Firm*—Connolly and Hutz

[57] ABSTRACT

The binder demand of particulate inorganic filler is reduced without essentially altering the filler's surface area by subjecting the filler alone to intense rotary impact agitation at a peripheral speed of from about 20 to 60 meters per second. Compositions comprising a binder together with a filler prepared by this method include those in which the binder comprises alkyd resin, especially an unsaturated polyester resin, epoxy resin or linseed oil and the filler comprises ground limestone, talc or hydrated alumina.

8 Claims, No Drawings

METHOD OF REDUCING BINDER DEMAND OF INORGANIC FILLER

CROSS-REFERENCE TO RELATED APPLICATION

This application is a continuation of application Ser. No. 873,975 filed Jan. 31, 1978 now abandoned.

BACKGROUND OF THE INVENTION

This invention relates to inorganic fillers. More specifically, it relates to a method of reducing the binder demand of such fillers.

Certain particulate inorganic material such as ground limestone and talc are commonly employed as fillers in many industrial products. For example, those products based on thermosetting and thermoplastic resin formulations normally contain considerable amounts of filler. Particularly in the case of thermosetting resins, use of a filler not only reduces product cost but may also offer other advantages such as improvement in the molding characteristics of the formulation. Because of such advantages, the desire to incorporate the maximum amount of filler into these resins can readily be appreciated. Consequently, methods of reducing a filler's binder demand, which is generally considered as the amount of binder required to completely wet out the filler to produce a binder-filler mixture of a given viscosity, are constantly being sought.

Past attempts at reducing the binder demand of inorganic fillers have included such approaches as alteration of the particle size distribution of the filler to minimize its void volume, compaction techniques and surface coating of the filler. While each of these attempts has met with some success, a more satisfactory method is still desired. The primary objective of this invention therefore is to provide such a method.

SUMMARY OF THE INVENTION

We have now found that the binder demand of an inorganic filler can be substantially reduced in a simple and inexpensive manner by subjecting the filler to the high intensity agitation of a rotating blade within a critical range of blade speeds. Accordingly, the present invention entails a method for reducing the binder demand of particulate inorganic filler without substantially altering the filler's surface area which comprises subjecting the filler alone to intense rotary impact agitation at a peripheral speed of from about 20 to 60 meters per second for a time sufficient to effect the desired reduction. The invention also entails compositions comprising a binder together with a filler prepared by this method. Preferably the binder is selected from alkyd resin, especially an unsaturated polyester resin, epoxy resin and linseed oil, and the filler from ground limestone, talc and hydrated alumina.

DETAILED DESCRIPTION OF THE INVENTION

The intense rotary impact agitation of the present invention provides a truly simple and effective method of reducing binder demand of particulate inorganic filler.

By intense rotary impact agitation is meant the subjection of the filler in a confined area to the intense agitation caused by blades or paddles rotating within the confined area. The blades or paddles, the terms being used interchangeably, typically rotate about a shaft and may have any suitable configuration and size. To produce the desired degree of impact agitation or turbulence, the peripheral speed of the blades or paddles is maintained at from about 20 to 60 meters per second. While restriction to a given theory is not intended, it is believed that the method of the present invention causes a reduction in the low energy attraction forces between particles of the filler which in turn causes reduced interaction when the filler is incorporated into various binder-filler systems. The net result of the treatment, therefore, is a filler of reduced tap density in powder form exhibiting lowered thixotropy in liquids. Moreover, this reduction is accomplished without a significant (less than 10 percent) reduction in the particle size or surface area of the filler. At blade peripheral, or tip, speeds substantially below about 20 meters per second, the impact agitation is insufficient to appreciably affect the attractive forces. On the other hand, at tip speeds substantially greater than about 60 meters per second, the impact agitation tends to cause a size reduction in the filler particles and a loss of the desired result.

Commercial equipment providing the desired intense rotary impact agitation of the present invention in both a continuous and a batchwise manner is readily available in the form of high intensity rotary mixers which normally do not affect the particle size distribution of fine materials.

Typical of continuous units are the various models of the Turbulizer sold by the Strong-Scott Mfg. Co., Minneapolis, Minnesota. In this equipment, particles of filler are introduced continuously into a cylindrical, horizontal chamber containing a rotatable shaft disposed along the longitudinal axis of the housing. About the shaft are a plurality of paddles, each approximately in the shape of the head of a screwdriver. By adjustment of the speed of the shaft and the pitch of the paddles, the degree of impact action, power input and retention time for the filler may be varied.

An example of units capable of providing the desired impact agitation in either a continuous or a batchwise manner is the series of Littleford Mixers supplied by Littleford Bros., Inc., Florence, Ky. Here, the desired agitation is supplied by high-speed flat or tulip-shaped chopper blades mounted on the wall of the horizontal, longitudinal chamber of the unit. Plow-shaped mixing tools are arranged along the chamber's axial shaft, but their comparatively slow rotation only assists in blending the particles of filler.

Typical of batch units providing the desired impact agitation are the Prodex/Henschel High-Intensity Mixers supplied by the HPM Division of Koehring, Mount Gilead, Ohio. With this unit, the filler is added batchwise to a vertical, cylindrical chamber having a pair of adjacent, pitched rotor blades mounted on a shaft disposed on the longitudinal axis of the chamber at the bottom of the chamber. The unit also contains a movable baffle on the cylindrical wall of the chamber parallel to the longitudinal axis. Variations in the pitch and speed of the blades and the location of the baffle determine the turbulence of the resulting rotary impact agitation.

Other batch units providing the desired impact agitation include the Turbulent Mixer supplied by the J. H. Day Company, Cincinnati, Ohio, and the Welex Mixer supplied by Welex, Inc., Blue Bell, Pa. The operation of the Day Turbulent Mixer is very similar to that of the Littleford batch mixer, with the desired impact agitation being furnished by rotating high-speed pinned discs mounted on the chamber wall. The agitation of the Welex unit is similar to that of the Prodex/Henschel unit, being furnished by an axially mounted bottom impeller comprising three levels of mixing blades.

High intensity rotary mixers, such as those described above, are commonly used for the blending of two or more dissimilar particulate solids, or of solids with small amounts of liquid, for example as disclosed in Chemical Abstracts, 83, 60638n and 83, 80437z. This is in contrast to the present process wherein the desired effect is achieved by rotary impact agitation on the filler alone.

The rotary impact agitation of the present invention is carried out for a time sufficient to obtain the desired reduction in binder demand. Routine experimentation will easily determine the optimum time, which is dependent inter alia on filler type and the specific geometry of the mixer. However, a convenient method of expressing the extent of rotary agitation needed is by the energy, or work, expended on the filler, measured as the product of the power input to and the duration of the agitation. In general, a minimum energy of about 50 joules per gram of filler is expended in the process to produce a significant effect. While there is no theoretical upper limit on the energy input to the process, inputs much above about 300 joules per gram of filler offer no further significant advantage. This energy input is the net energy expended on the filler, corrected for any energy consumed in running the unit performing the agitation without the filler present.

A method of measuring the effect obtained by the process of the present invention is by determining the reduction in the viscosity of a binder-filler mixture. This can be accomplished by comparing the viscosity of the same binder-filler mixture using treated and untreated filler at the same filler loading. The process of the present invention preferably results in a reduction of about 20 percent or greater in the viscosity of the binder-filler mixture.

While not critical to the present process, the filler temperature may require control during processing of those fillers having a high degree of moisture content to minimize water loss from, and possible change in the nature of, the filler. The temperature therefore is normally maintained below about 90° C. and preferably in the range of about 20° to 60° C.

The present process may be applied to numerous particulate inorganic fillers, particularly those having a top size, or maximum equivalent spherical diameter, of about 75 microns. While there is no practical lower limit, fillers of top size less than about 0.1 micron are not preferred. Especially responsive to the process are such fillers as ground limestone, either as calcite or dolomite, hydrated alumina, talc, wollastonite and precipitated calcium carbonate. Combinations of these fillers, such as ground limestone with precipitated calcium carbonate, may also be used. Of particular interest is ground limestone.

The fillers of reduced binder demand prepared by the method of the present invention can readily be used in any system now employing such fillers. They are especially valuable, however, in thermoplastic and thermosetting resin formulations and in pastes for paint, varnishes and other high decorative finishes, where high filler loadings of from about 40 to 85 weight percent are employed.

Particularly suitable thermosetting resins include epoxys, phenolics and alkyds, especially unsaturated polyesters in such formulations as BMC (bulk molding compound) and SMC (sheet molding compound). In the typical unsaturated polyester formulation for SMC, such as disclosed, for example, in Canadian Pat. No. 887,693, the liquid binder, composed of an $\alpha$, $\beta$-ethylenically unsaturated polyester, such as poly(propylene glycol maleate), and a thermoplastic polymer, such as polyacrylic acid esters, polyvinyl acetate or polystyrene, dissolved in the cross-linking monomer, such as styrene, is compounded with other ingredients including filler, such as crushed limestone, reinforcing fibers, such as glass fibers, chemical thickening agent, such as calcium or magnesium hydroxide, cure catalyst and minor components, such as mold release agent and pigment, before the formulation is cured. In such formulations, the treated ground limestone of the present process is especially advantageous at filler levels of from about 40 to 75 weight percent of the binder-filler content of the formulation because of the reduced viscosities it affords.

With pastes, especially those in which the binder comprises linseed oil or alkyd resin, the treated filler, such as ground limestone, because of its reduced binder demand, can be incorporated at higher levels.

The following examples are merely illustrative and should not be construed as limiting the invention as defined by the claims.

EXAMPLE 1

A 1000 g sample of ground limestone of 15 micron top size and 2.5 micron average spherical diameter[1] was charged to a Model 2 JSS Prodex/Henschel High-Intensity Mixer. The charge was agitated for 20 minutes at 3800 rpm (blade tip speed 42 meters/sec), the temperature being maintained at a maximum of 60° C. by the circulation of cold water through the jacket, and then discharged from the unit.

[1]Vicron 15—15; Pfizer Inc., New York, N.Y.

Comparison of the treated and untreated filler indicated no significant change in particle size, as measured by both Sedigraph X-ray analysis and scanning electron micrograph, or surface area, as measured by nitrogen adsorption. The treatment did result in a reduction in tap density of the filler from 0.99 to 0.91 g/ml.

The relative binder demand of fillers can be expressed in terms of the relative viscosities of binder-filler mixtures. In one illustration, 360 g of filler is added to 240 g of a modified polyester (60/40 polyester resin in styrene solution/low profile additive)[2] at about 75° F. (23.8° C.) contained in a 600 ml polypropylene beaker. The beaker contents are immediately mixed using an Arrow air-driven stirrer set at 80 psig. The mixing is continued until the temperature of the mixture reaches 85° F. (29.4° C.). The viscosity of the 40-60 binder-filler mixture (filler loading 60 weight percent) is then measured in the beaker using a Brookfield HBT viscometer, #6 spindle, at 5 rpm.

[2]Paraplex P-19D; Rohm & Haas Company, Philadelphia, Pa.

Using this procedure, the above treatment resulted in a viscosity reduction fro 95,000 to 42,000 centipoises (cps), or 56%.

When the viscosities of the same binder-filler mixtures were measured using a spindle speed of 50 rpm rather than 5 rpm, the viscosity reduction from the treatment was from 32,000 to 20,000 cps, or 37%, indicating that the filler had lost a considerable portion of its thixotropic property in SMC pastes as a result of the treatment.

The above treatment was repeated using blade speeds of 2600 and 1800 rpm (29 and 20 meters/sec), resulting in viscosity reductions (measured at 5 rpm) to 55,000 and 60,000 cps (42 and 37%), respectively.

EXAMPLE 2

The treatment of Example 1 (20 minutes, 3800 rpm) was repeated on a variety of particulate inorganic fillers using a 1000 g charge of filler. The effect of the treatment on viscosity was determined as in Example 1 (at 5 rpm) with some variation in filler loading, as summarized below:

| Filler | Filler Loading wt. % | Viscosity/$10^3$, cps Untreated | treated | % Viscosity Reduction |
|---|---|---|---|---|
| clay[1] | 30 | 177.6 | 131.2 | 26 |
| hydrated alumina[2] | 60 | 93.8 | 60.8 | 34 |
| talc[3] | 50 | 904 | 280 | 69 |
| wollastonite[4] | 60 | 184 | 56 | 70 |

[1] ASP 170; Engelhard Minerals and Chemicals Corp., Edison, New Jersey; top size 4 microns
[2] Alcoa C-331; Aluminum Company of America, Pittsburg, Pennsylvania; average spherical diameter 8 microns
[3] CP 38-33; Pfizer Inc.; top size 38 microns
[4] Nyad ® 400; Interpace Corp., Willsboro, New York; top size 25 microns

EXAMPLE 3

The treatment of Example 2 was repeated using ground limestone, dolomite and talc. The effect of the treatments on viscosity was determined as in Example 1 (at 5 rpm) in different binder-filler systems at various filler loadings, and is summarized below:

| Filler | Binder | Filler Loading wt. % | Viscosity/$10^3$, cps untreated | treated | % Viscosity Reduction |
|---|---|---|---|---|---|
| ground limestone[1] | epoxy[4] | 60 | 699 | 213 | 70 |
| ground limestone | epoxy | 40 | 51.2 | 51.2 | 0[5] |
| ground limestone | linseed oil | 75 | 107.2 | 75.2 | 30 |
| ground dolomite[2] | epoxy | 60 | 317 | 129.6 | 59 |
| ground dolomite | epoxy | 40 | 28.8 | 25.6 | 11 |
| ground dolomite | linseed oil | 75 | 24 | 24 | 0[5] |
| talc[3] | epoxy | 45 | 754 | 427 | 43 |
| talc | linseed oil | 60 | 219 | 19.2 | 91 |

[1] Vicron 25-11; Pfizer, Inc.; top size 25 microns
[2] Dolocron 32-15; Pfizer, Inc.; top size 32 microns
[3] CP 38-33
[4] Araldite 6020; Ciba-Geigy Corp., Ardsley, New York
[5] Filler loading too low to reflect advantage of treatment

EXAMPLE 4

The treatment and viscosity determination of Example 2 (at 60 percent loading) was repeated on a sample of ground limestone having a top size of 25 microns and an average spherical diameter of 6 microns[1]. The treatment resulted in a viscosity reduction from 50,000 to 25,000 cps, or 50%.
[1] Vicron 31-6; Pfizer Inc.

A second sample of the same filler was treated for 20 minutes on the Model FM-130D Littleford Mixer (batch mixer) with standard choppers (blade tip speed 22 meters/sec), resulting in a viscosity reduction to 32,000 cps, or 36%.

A third sample of the filler was passed through the Model PC-75 Pulvocron[2] high speed impactor operating with one beater plate at 5820 rpm (tip speed 100 meters/sec). The treatment resulted in a viscosity reduction to only 42,000 cps, or 16%.
[2] Strong-Scott Mfg. Co.

EXAMPLE 5

A blend of 92 percent by weight ground limestone having a top size of 26 microns and an average spherical diameter of 8.8 microns[1] with 8 percent precipitated calcium carbonate having an average spherical diameter of 0.5 micron[2] was fed continuously to a Model TC-14 (35 cm diameter) Turbulizer operating at 2300 rpm (blade tip speed 42 meters/sec) with the paddles arranged such that the throughput rate was 4900 lb/hr (2220 kg/hr). The filler was passed through the unit a total of three times, resulting in a final product temperature of 45° C., a net energy consumption of 140 joules/g of filler and a viscosity reduction, determined as in Example 1 (at 5 rpm), for the filler of from 40,000 to 19,200 cps, or 52%.
[1] Vicron 31-6; Pfizer Inc.
[2] Albaglos; Pfizer Inc.

A fourth pass through the Turbulizer did not produce a further viscosity reduction.

What is claimed is:

1. A method for reducing the binder demand of particulate inorganic filler without substantially altering said filler's surface area, which comprises subjecting said filler alone to intense rotary impact agitation at a peripheral speed of from about 20 to 60 meters per second for a time sufficient to reduce said binder demand.

2. The method of claim 1 wherein said filler is selected from the group consisting of ground limestone, talc and hydrated alumina.

3. The method of claim 1 wherein the energy expended on said agitation is at least about 50 joules per gram of said filler.

4. A composition consisting essentially of a binder together with a filler prepared by the method of claim 1.

5. The composition of claim 4 wherein said binder is selected from the group consisting of alkyd resin, epoxy resin and linseed oil.

6. The composition of claim 4 wherein said binder is an unsaturated polyester resin.

7. The composition of claim 6 wherein the filler is ground limestone.

8. A filler of reduced binder demand prepared by the method of claim 1.

* * * * *